(12) United States Patent
Young (10) Patent No.: US 6,322,355 B1
(45) Date of Patent: *Nov. 27, 2001

(54) METHOD AND APPARATUS FOR DISPOSING OF WASTE DUST GENERATED IN THE MANUFACTURE OF CEMENT CLINKER

(75) Inventor: Rom D. Young, Dallas, TX (US)

(73) Assignee: Texas Industries, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/584,895

(22) Filed: Jun. 1, 2000

Related U.S. Application Data (63) Continuation of application No. 09/420,734, filed on Oct. 20, 1999, now Pat. No. 6,109,913.

(51) Int. Cl.⁷ ........................................................ F27B 15/12
(52) U.S. Cl. ........................ 432/16; 432/105; 432/106; 110/246; 110/259; 110/266; 110/345; 110/346
(58) Field of Search ........................... 432/16, 105, 106; 110/345, 346, 235, 236, 246, 259, 266

(56) References Cited

U.S. PATENT DOCUMENTS

| | | | | |
|---|---|---|---|---|
| 4,265,671 | * | 5/1981 | Kroyer | 106/758 |
| 4,678,514 | * | 7/1987 | Deyhle et al. | 106/745 |
| 6,109,913 | * | 8/2000 | Young | 432/16 |

* cited by examiner

*Primary Examiner*—Jiping Lu
(74) *Attorney, Agent, or Firm*—Jones, Day, Reavis & Pogue (57) ABSTRACT

A method of disposing of undesirable chemical compounds in waste dust generated in a first kiln in the manufacture of cement clinker by using the dust and slag as the feedstock material to a second kiln, heating the feedstock material in an oxidizing atmosphere, and raising the heat sufficient to diffuse the waste dust and the slag to form a hydraulic product such as cement clinker and lime but insufficient to volatilize previously precipitated chemical compounds in the feedstock material.

32 Claims, 3 Drawing Sheets

METHOD AND APPARATUS FOR DISPOSING OF WASTE DUST GENERATED IN THE MANUFACTURE OF CEMENT CLINKER

This is a continuation of application Ser. No. 09/420,734 filed Oct. 20, 1999, U.S. Pat. No. 6,109,913.

BACKGROUND OF THE INVENTION

1. Field of the Invention

The present invention relates in general to waste material disposal and in particular to the disposal of reclaimed waste dust that contains undesirable chemical compounds, such waste dust including cement kiln dust (CKD) and alkaline bypass dust (ABD) that is generated during the formation of cement clinkers in a cement making process using a kiln. The preferred kiln is of the type such as a rotary kiln or a vertical kiln. The waste dust may be utilized to form cement clinker or to make lime.

2. Description of Related Art Including Information Disclosed Under 37 CFR 1.97 and 1.98

In the production of Portland cement clinker, there are certain undesirable chemical compounds collected in Cement Kiln Dust (CKD) and Alkali Bypass Dust (ABD) such as chlorine, sulfur, and alkali and other various precipitated chemical compounds as is well-known in the art. These chemical compounds are volatilized into waste gases in the burning zone of a high temperature (approximately 1500 degrees C. or 2732 degrees F.) rotary kiln and are recovered with pollution control equipment as kiln dust (CKD and ABD). Depending upon the process and the chemistry of the raw material and fuel, a portion of the kiln dust can be returned to the kiln feed and processed into Portland cement clinker. Normally, most of this kiln dust is wasted and must be placed in a landfill. Some kiln dust is used for fertilizer and soil stabilizer depending on its chemical composition.

Commonly assigned U.S. Pat. Nos. 5,494,515 and 5,421,880 disclose processes for using crushed and screened blast furnace slag and steel slag, respectively, to form cement clinkers. During such processes, as disclosed therein, temperatures in the kiln are approximately 1500 degrees C. (2732 degrees F.). At these temperatures, well-known chemical processes occur to form cement clinker that exits the heat end of the kiln and that generate waste gases containing feedstock dust and precipitated undesirable chemical compounds as set forth above.

Because of the nature of these waste gases, government regulations require that pollution control equipment be installed to remove the dust containing the undesirable precipitated chemical compounds to a level sufficient to meet government standards. These pollution control devices can generate hundreds of tons of waste dust every day that must be reclaimed and a location found for its disposal. The amount of waste dust generated depends upon the production capacity of the cement making plant. Disposal of the reclaimed waste dust is usually done by means of landfills or stock piles. If one assumes that a plant can generate 300 tons of waste dust a day 365 days a year, then there must be a land fill capable of storing approximately 110,000 tons of reclaimed waste dust for each year of cement clinker production. In 10 years, over one million tons of reclaimed waste dust must be stored somewhere for each average cement plant.

Waste dust is defined herein as the cement kiln dust (CKD) and alkaline bypass dust (ABD) recovered from the exhaust gases generated in a cement clinker manufacturing process with the use of well-known pollution control equipment associated with rotary kilns or vertical kilns.

Further, various government entities are looking at reclaimed waste dust as an environmental problem that must be solved. Thus, attempts are being made to reduce the level of emissions of the undesirable precipitated chemical compounds that are found in, and contribute to, huge masses of waste dust that must be reclaimed or stockpiled.

U.S. Pat. Nos. 4,173,487; 4,584,022; and 5,782,973 relate to methods for processing kiln dust at high temperatures in specially designed kilns, where the volatile materials are separated by heat, collected in scrubbers, and can be sold as products such as fertilizers. Any remaining material is usually returned to the kiln as kiln feed.

One such method such as that disclosed in U.S. Pat. No. 5,782,973 is a process for the recovery of cement plant alkali by-pass dust (ABD) utilizing a fluid bed reactor system. The method attempts to recover 90% of the kiln dust as a usable, low alkali, cement product in addition to an alkali-salt product that has a commercial value as a source of potassium for fertilizer use. It is said that, in this process, the low alkali cement can be blended into higher alkali rotary kiln products to produce a controlled alkali level end product. It requires a feed of 4×20 mesh pelletized raw material. The pellets are formed with coal or coke and ABD and are injected into a counter flow preheat shaft and fall through the combustion gases. The pellets are rapidly preheated and partially calcined. They then enter a fluidized bed with up to 90% of the process coal or coke fuel required being formed as a part of the pellets to bring the carbon content of the final raw material to a point between three and nine percent by weight. The pellets are then fired and the cement clinkers are formed. The $NO_x$ and $SO_x$ emissions are said to be less than conventional systems due to the low temperature combustion (2012 to 2552 degrees F.—1100 degrees C. to 1400 degrees C.) that takes place in the fluidized bed and the use of natural gas as heating fuel. This system uses a well-known reducing atmosphere wherein the oxygen in the coke or coal is used as a heating element and, during combustion, generates a gaseous sulfur and alkali by-product. Some of the compounds in the by-product are $K_2SO_4$, $Na_2SO_4$, and may contain other compounds. The potassium and sodium compounds are alkali products that have a commercial value as a source of potassium for fertilizer use.

Hence, newly generated waste dust still remains as an alkali dust product that is used as a fertilizer. Thus there remains the problem of disposal of the by-products of the cement making process. With this described prior art system, a fertilizer business must be operated in parallel with the cement clinker operation.

In another prior art system, the waste dust from a kiln is reclaimed and used in that same kiln as a feedstock material in a process for making cement clinker. The high temperatures dissociate, or volatilize, up to 100% of the undesirable compounds in the reclaimed waste dust such as chlorine, sulphur, and alkalis, and cement clinkers are formed. Also, in this process, the undesirable volatile compounds in the CKD material (as well as those in the added feedstock material) are once again dissociated by the high temperatures and simply create new waste dust that must be reclaimed and the disposal problem remains. In addition, the high percentage of the volatile materials in the reclaimed waste dust (that is added to the input feedstock material entering the feed end of the traditional rotary cement kiln) causes the feedstock material within the kiln to become sticky and creates undesirable plugging and mud ring or clinker buildup. Thus, the use of the waste dust restricts the normal flow of raw feedstock materials by the formation of mud rings and clinker rings inside the wet or dry rotary kiln. In addition, in the dry process, material builds up in the preheater/precalciner and causes plugging. These problems cause production losses, burning problems, material quality problems and do not resolve the environmental problems (in both the air and in landfills). See also U.S. Pat. Nos. 5,219,544; 5,437,721; and 5,919,301.

There are some commercial uses for CKD and ABD but the market is limited and the excess has to be placed in a landfill.

It would be advantageous to have a waste dust disposal system that not only used the reclaimed waste dust in a process for making hydraulic materials such as cement clinkers or lime but which also used all of the undesirable chemical compounds in the reclaimed waste dust, including newly generated waste dust so that the disposal problem is eliminated.

SUMMARY OF THE INVENTION

The purpose of the present invention is to utilize Portland cement kiln dust to produce Portland cement clinker at a temperature below the temperature of volatilization of the above-mentioned undesirable chemical compounds. This clinker will essentially retain these volatile compounds, plus the normal calcium silicate, aluminates, calcium ferrites, calcium sulfates, and can be classified as a Portland cement clinker. The kiln dust, either as it is generated by a kiln or as taken from a stockpile, is added back into the production of Portland cement clinker in another, second, kiln at a controlled rate as is well-known in the art. With the use of additional feedstock material in varying quantities, special Portland cements can be formed, again, as is well-known in the art. This will increase cement production and eliminate kiln dust being land filled thereby improving the environment as well as improving the economics of cement clinker production.

It is well known that lime can be formed in a cement kiln by varying the time that the feedstock material is in the kiln at any given temperature in the range of approximately 1650 degrees F. (900 C.) to about 2200 degrees F. (1200 C.). Thus, the higher the temperature, the shorter the time the feedstock material is left in the kiln. Conversely, the lower the temperature, the longer the time the feedstock material is left in the kiln.

The present invention disposes of the reclaimed waste dust from a first kiln (defined herein as Cement Kiln Dust [CKD] and/or Alkali By-pass Dust [ABD] in a separate second cement kiln to form hydraulic material defined herein as cement clinker and lime.

Thus the novel invention deals with the disposal of CKD and ABD by processing it in an oxidizing atmosphere in a separate kiln at a much lower temperature than used in the normal cement making process but sufficient to melt and diffuse the slag and the waste dust to form the Portland cement clinker but insufficient to volatilize the volatile compounds and they are retained in the cement clinker that is formed.

In particular, the invention relates to a method and apparatus for the manufacture of Portland cement clinker in conventional wet or dry process cement clinker kilns, wherein steel slag, or other commonly known slags such as blast furnace slag, copper slag, and coal slag, are added at the input end of the kiln, with a stream of feedstock material containing kiln dust, such that the stream of feedstock and slag move toward the heat at the heat end of the kiln. The slag is melted and diffused into the feedstock material to form cement clinker. It is not necessary to grind any of these raw materials although they could be ground and used. Also, pelletized feedstock material could be used. Crushing and screening slags with a maximum of substantially 2" diameter (50 mm) will produce usable slag raw feedstock material. However, if desired, for any reason any of the feedstock materials, including slags, could be ground and used. Kiln dust is already fine enough to react.

The novel process is accomplished by feeding waste dust into the feed end of a kiln, rotary or otherwise, and adding to it a well-known slag product such as steel slag, blast furnace slag, copper slag, or coal slag, in either a wet or a dry process, with the kiln having an oxidizing atmosphere. The feedstock is heated to a temperature in the range of about 2000 to about 2550 degrees F. (1100 to 1400 degrees C.) and preferably at 2200 degrees F. (1200 degrees C.) At this heat, in an oxidizing atmosphere, the feedstock material undergoes a well-known chemical reaction to form cement clinker or lime, depending upon the time/temperature relationship in the kiln as is well known. However, because the atmosphere in the kiln is an oxidizing atmosphere, the oxygen molecules of the solids are not required in the generation of the heat necessary to bring about the required chemical reactions (as is the case in a reducing atmosphere). The undesirable solid chemical compounds remain in solid state in the cement clinker or lime that is formed. There are, of course, gases generated by the heat but these gases carry no volatilized waste products that would require landfill disposal. They do, however, carry dust particles having entrained undesirable waste products that are removed in a conventional manner and transported back to the feed-end of the second kiln as a feedstock material. They can be fed back to the feed-end of the kiln because, at the comparatively low operating temperature of the kiln, there is no problem with sticking or plugging of the kiln due to mud ring or clinker buildup. Thus, all undesirable solid particles, that would otherwise have to be placed in a landfill, are utilized in this process.

Thus it is an object of the present invention to provide a process for disposing of waste dust created in the formation of cement clinker.

It is also an object of the present invention to provide a process for forming cement clinker or lime utilizing waste dust and a well-known slag material such as coal slag, copper slag, steel slag, or blast furnace slag.

It is still another object of the present invention to provide a process for forming cement clinker utilizing waste dust and a slag material that is heated in an oxidizing atmosphere to a temperature sufficient to form a cement clinker but that is insufficient to cause significant volatilization of undesirable chemical compounds in the waste dust and the slag material that would otherwise have to be placed in a landfill.

Thus, the present invention relates to a method of disposing a first waste dust that contains undesirable precipitated chemical compounds that would otherwise have to be placed in a landfill and that are generated in a first kiln in a process for forming cement clinker, the method comprising the steps of inputting the first waste dust as a feedstock material to the input of a second kiln, adding to the first waste dust an amount of slag material to form cement clinker or lime, heating the first waste dust and slag material in the second kiln in an oxidizing atmosphere to a temperature sufficient to form cement clinker or lime but insufficient to volatilize the majority of the undesirable chemical compounds that normally require landfill disposal, generating a second waste dust in the second kiln during the process of disposing of the first waste dust; and transferring said second waste dust as a feedstock material to the feed end of said second kiln thereby using substantially all of the undesirable waste products that normally have to be placed in a land fill.

BRIEF DESCRIPTION OF THE DRAWINGS

These and other features of the present invention will be more fully disclosed when taken in conjunction with the following Detailed Description of the Invention in which like numerals represent like elements and in which.

DETAILED DESCRIPTION OF THE INVENTION

Figure 1:
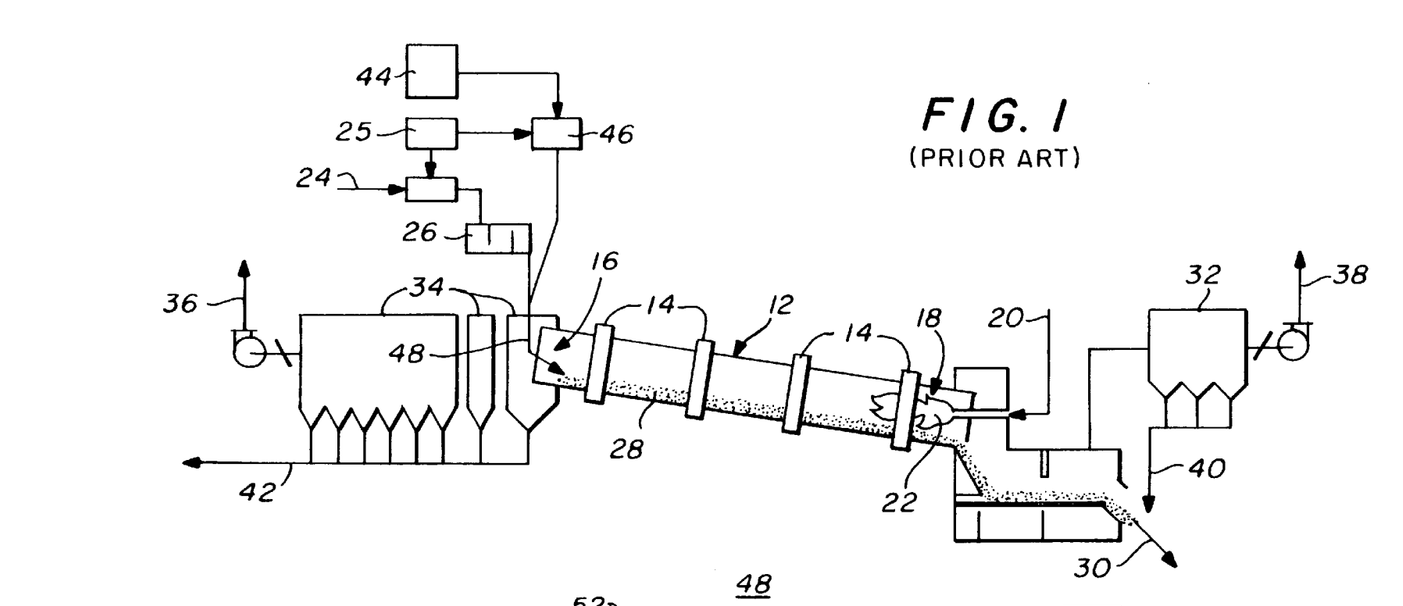
FIG. 1 is a block diagram of a prior art rotary cement kiln used in a process for forming cement clinkers and, in the process, generating waste dust or CKD (cement kiln dust)

Shown in FIG. 1 is a block diagram of cement forming apparatus of the prior art as disclosed in commonly assigned U.S. Pat. No. 5,421,880 (incorporated herein by reference in its entirety) in which a process allows steel slag to be added to the kiln feed as a separate component at the feed-end of the rotary cement kiln in various particle sizes to a maximum diameter of substantially 2". The apparatus 10 includes the rotary kiln 12 supported in a well-known manner by flanges 14 that rotate with the kiln. The kiln has a feed-end 16 and a heat-end or burning zone 18. The heat-end 18 is tilted downwardly with respect to the feed-end 16 as is well known in the art. A fuel source 20 creates a flame 22 in the heat-end of the rotary kiln 12 to provide a temperature of approximately 1500 degrees C. (2732 degrees F.). Cement raw materials or feedstock such as limestone, clay, and the like is carried by a variable speed conveyor belt 24 to the rotary kiln 12. If a wet slurry is used, the variable speed conveyor belt 24 will convey the feedstock to a grinder 26 and from the grinder 26 to the feed-end 16 of the rotary kiln 12. The steel slag 44 is carried by a conveying device 46, such as a variable speed conveyor belt, to the feedstock material 48 that is being fed through a dust hopper (not shown) at the feed-end 16 of the rotary kiln 12. The feedstock moves in a stream 28 through the rotating kiln 12 toward the flame 22. The well-known chemical processes take place within the kiln 12 and the cement clinker 30 exits the heat-end of the kiln 12 for further processing. Pollution control devices 32 and 34, well known in the art, are at the heat-end and feed-end, respectively, of the kiln 12. At the heat-end 18, out of the pollution control device 32, waste gases 38 are expelled to atmosphere and reclaimed waste products 40 are recovered. At the feed-end 16, the pollution control equipment 34 removes the waste gases 36 which are expelled and the waste products are reclaimed at 42. It is these waste products, known as Cement Kiln Dust (CKD) and, in the alkali by-pass dust systems, known as Alkali By-pass Dust (ABD), that must be carried to land fill areas for disposal and which may now be viewed as environmentally unfriendly. Large quantities of this material are generated in the production of cement clinker. For instance, in a typical rotary kiln cement clinker forming process, as much as 300 tons of CKD or more, will be generated each day. In other systems, ABD is created and it has the same disposal problem as CKD.

Figure 2:
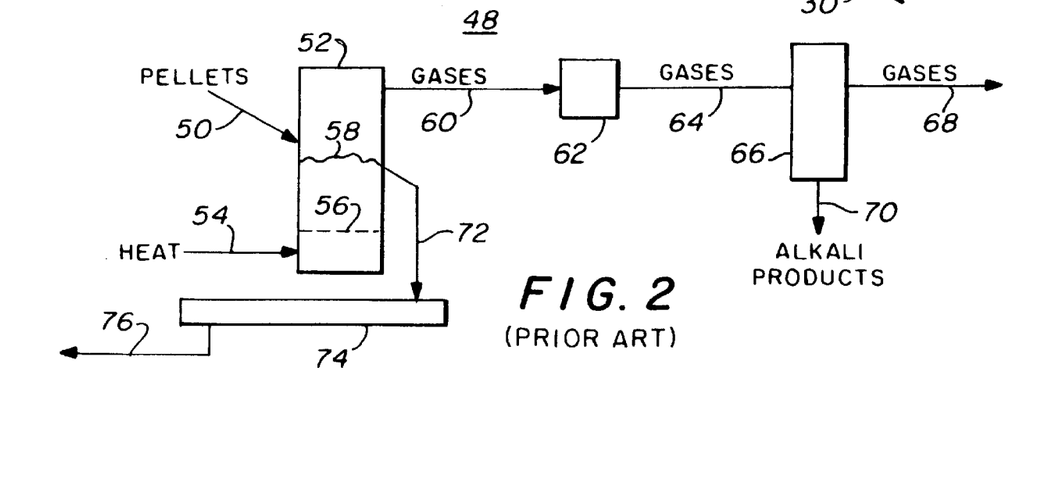
FIG. 2 is a block diagram of a prior art system for using alkali by-pass dust (ABD) in a process to reclaim the ABD.

FIG. 2 is a generalized block diagram of a prior art system for processing ABD and recovering the usable cement making compounds within the ABD and concentrating the alkali salts remaining to make it a saleable by-product such as a potassium product for use as a fertilizer. This process requires the kiln dust as produced to be pelletized into 4×20 mesh sizes with up to 90% of the process coal or coke fuel required in the process to be added to the pellets. This is necessary because the system uses a reduction method in processing the feedstock material. This means that the oxygen needed for heating of the feedstock material is at least partially derived from the coke or coal thereby reducing the feedstock material and leaving by-products that are in the gases exiting the kiln.

Thus, in the firing of the pellets, a reduction system (due to the coal or coke present in the pellets) takes place within the pellets when fired to form cement clinker. In this process, the reduction process causes a high level of alkali and sulfur to be volatilized and later precipitated for removal. The system can also be oil or gas fired but then there is a reduced level of alkali removal.

In the system 48, shown in FIG. 2, the pellets 50, formed of the ABD and the coal or coke, are fed into a fluidized bed reactor that includes a vertical kiln 52 and a fluid bed cooler 74. Heat is supplied at 54 and the coal or coke in the pellets 50 give off oxygen to enable combustion to continue. A grate 56 supports the pellets 50 above the heat source 54. As the fluidizing gas passes upward through the pellets 50 above the grate 56, the pellet bed material 58 is maintained in a highly active fluidized state. As the pellets 50 in the bed material 58 in the kiln 52 are heated to the relatively low temperature in the range of 2300 to 2400 degrees F., a reduction takes place in the fluid bed reactor 52 releasing exhaust gases 60 that include the alkali and sulfur compounds. These exhaust gases are initially processed in a well-known manner at 62 and then are fed at 64 to a scrubber or dust collector 66 where ABD is generated at 70 and gases are expelled at 68 to a conventional stack for discharge into the atmosphere.

Product is discharged from the system at overflow 72 and falls on a fluid bed cooler 74. Here the product is cooled with cooling air supplied from a fan or other source.

In the high efficiency dust collector 66, solid material is discharged at 70 while the gas 68 is discharged to atmosphere generally through a stack. The various reactions that take place within the dust pellets during firing in the reactor are as follows:

-continued

As can be seen, this process results in vaporized or volatilized alkali oxides and $CO_2$ and $SO_2$ in the gas leaving the reactor. Once these gases cool, the alkali condenses to form alkali salts that are collected in the dust collector 66. It is said that an 80–85% alkali-salt product was produced that should have a commercial use as a source of potassium for fertilizer.

Thus, with this system, more by-products are generated and a use must be found for them to avoid stockpiles or landfills. In this case, the cement company must also go into the fertilizer business in order to dispose of the final waste product.

Figure 3:
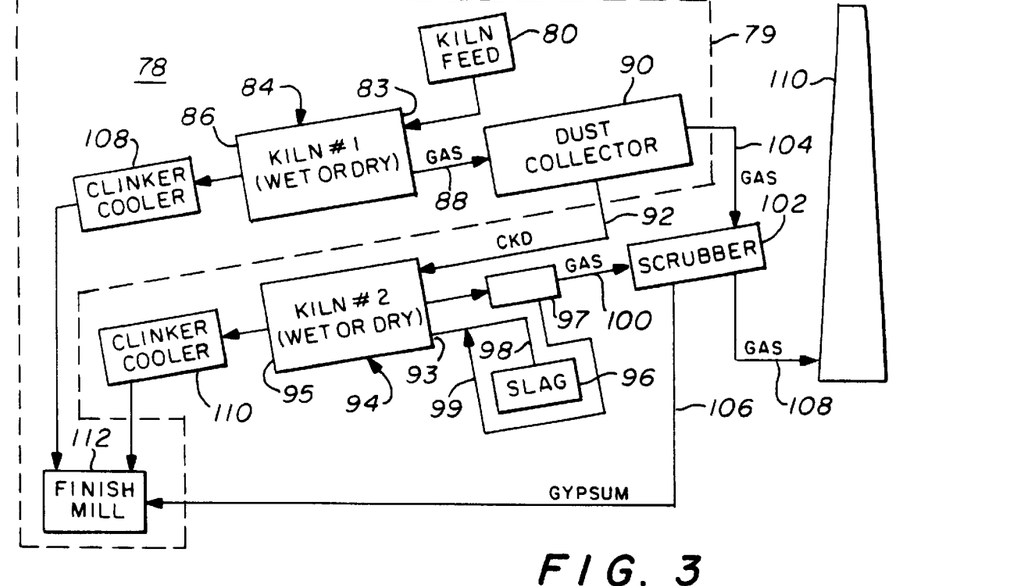
FIG. 3 is a block diagram of the novel waste dust disposal system of the present invention.

The novel system of the present invention is set forth in block diagram form in FIG. 3. As shown therein, the system 78 includes apparatus within dashed lines 79 for making cement clinker as disclosed in commonly assigned U.S. Pat. No. 5,421,880. Thus, a kiln feed 80 provides feedstock material by means of a conveyor belt or transport means 82 to the feed-end of the rotating kiln 84. The feedstock may be either a wet or dry process. Heat is applied at the heat-end 86 to process the feedstock material into cement clinker. The cement clinker is cooled at 108 and then carried to a finish mill 112.

As the process is carried out at high temperatures (2700 degrees F.—1500 degrees C.), certain undesirable chemical compounds mentioned earlier are volatilized and expelled from the kiln 84 with the hot gases at 88 and are carried to a precipitator or other device 90 where the solids are removed as CKD at 92. The remaining clean gases are coupled to a stack 110 for expulsion into the air.

It is the CKD, as much as several hundred tons per day per plant, that is carried to landfills in the prior art. However, FIG. 3 illustrates the apparatus necessary to utilize the CKD so that it does not have to be land filled. It will be understood that the source of the CKD could be a landfill deposit of CKD instead of from kiln 84.

In FIG. 3, the CKD at 92 is carried by any well-known transport means to the feed-end of a second kiln 94. The kiln 94 may be a rotating kiln, a vertical kiln, or any other type of kiln. Also fed into the feed-end of the second kiln 94 is slag 96 that is carried to the kiln 94 by any well-known means 98. The slag can be well-known slags such as coal slag, copper slag, blast furnace slag, or steel slag that have within them the well-known constituents necessary for forming cement clinker. Thus, the feedstock material includes CKD, ABD, slags of various kinds, and other well-known raw materials that have already been processed at a temperature sufficiently high to volatilize undesirable chemical compounds and form various cement compositions at the operating temperature of kiln 94.

The feedstock material, the CKD (and/or ABD) and the slag, is heated in the kiln 94 in an oxidizing atmosphere at a low temperature in the range of from about 2012 degrees F. (1100 degrees C.) to about 2552 degrees F. (1400 degrees C.). Three novel features are present in the invention. The first is the use of CKD (or ABD) and slag as the feedstock material. Because the slag has already been through the extremely high heat of the steel, iron, coal, or copper making processes and the cement clinker making process, the necessary chemical reactions for cement clinker production have already taken place and undesirable volatile materials have already been removed from it. These volatile materials are now in the CKD or ABD that was recovered from a first kiln during its use in making cement clinker. The second is the use of low temperatures (2012–2552 degrees F.—1100–1400 degrees C.) in second kiln 94. This temperature is too low to again volatilize the majority of solid undesirable chemical compounds recovered in the waste dust. Thus, substantially all of these chemicals stay in the waste dust material that is being used in the second kiln to form cement clinkers and are not volatilized. Third, because the atmosphere in the kiln 94 is an oxidizing atmosphere, the oxygen in the feedstock material, either the waste dust or the slag, is not necessary for heating and thus there is no reduction that takes place in the feedstock material that would lead to a chemical dissociation of the feedstock material and thus there is no generation of undesirable waste products in the flue gases that, when solidified, would have to be placed in a land fill. Therefore, the CKD or ABD is substantially all utilized in the process for making the cement clinker. Of course, the movement and agitation of the waste dust and slag in the second kiln 94 does in fact, create the generation of some new waste dust containing the undesirable chemical compounds. However, that new waste dust can be reclaimed from the hot gases at 100 by waste recovery system 97. They are returned at 99 to the input of the second kiln 94. The cement clinker produced is fed to cooler 110 and then can be added back to regular cement clinker produced in kiln 84 to produce various types of cement in a well-known manner.

Thus, by adjusting the composition of the feedstock material into the kiln 94, a Portland cement clinker could be produced that can be used to form a special cement including, but not limited to, rapid set, expansive cement, oil well cements, and soil stabilization cement, all of which are well known in the cement art.

Of course, there are some undesirable gas compounds, such as $SO_2$ in the flue gases 100 and these are coupled to a scrubber 102, where they are eliminated at 106 by chemically combining them with other harmless elements such as, but not limited to, lime, limestone, or ammonium compounds, to form a harmless gas and a solid product such as gypsum. The harmless gases are coupled at 108 to the stack 110 for discharge into the atmosphere. The recovered solids at 106, such as gypsum, could be placed in a landfill. However, it can also be added to the regular cement clinker at the finish mill 112.

Figure 5:
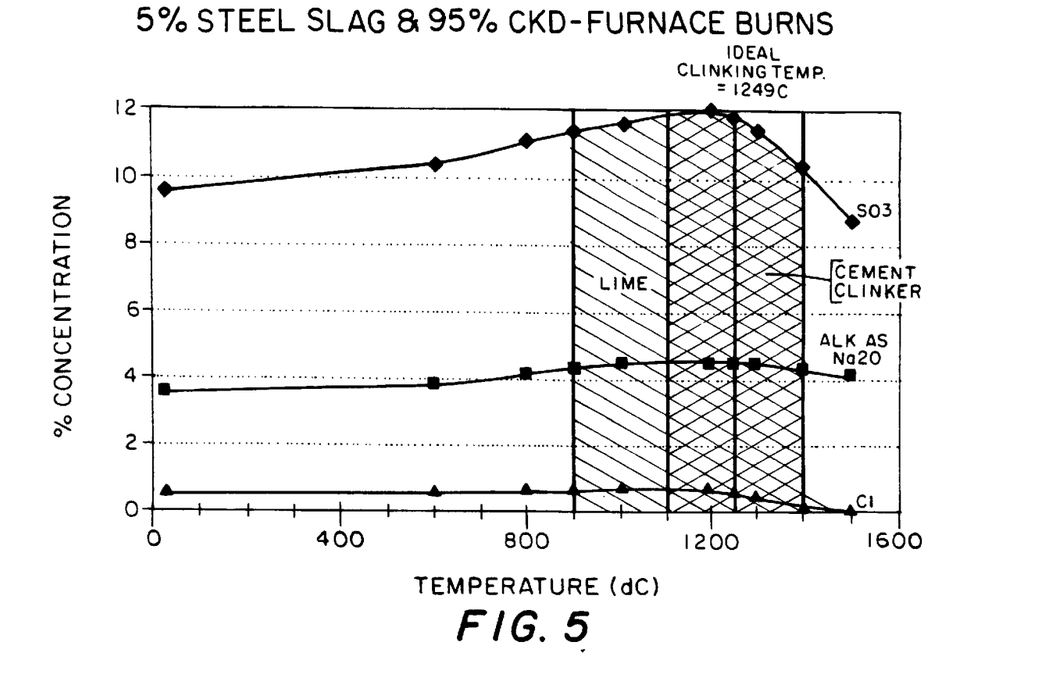
FIG. 5 is a graph illustrating that in the desired temperature range, the concentration of undesirable chemical compounds in a mixture of steel slag and CKD is essentially maintained constant in the solid state and is not volatilized and then precipitated out of the waste gases.
Figure 6:
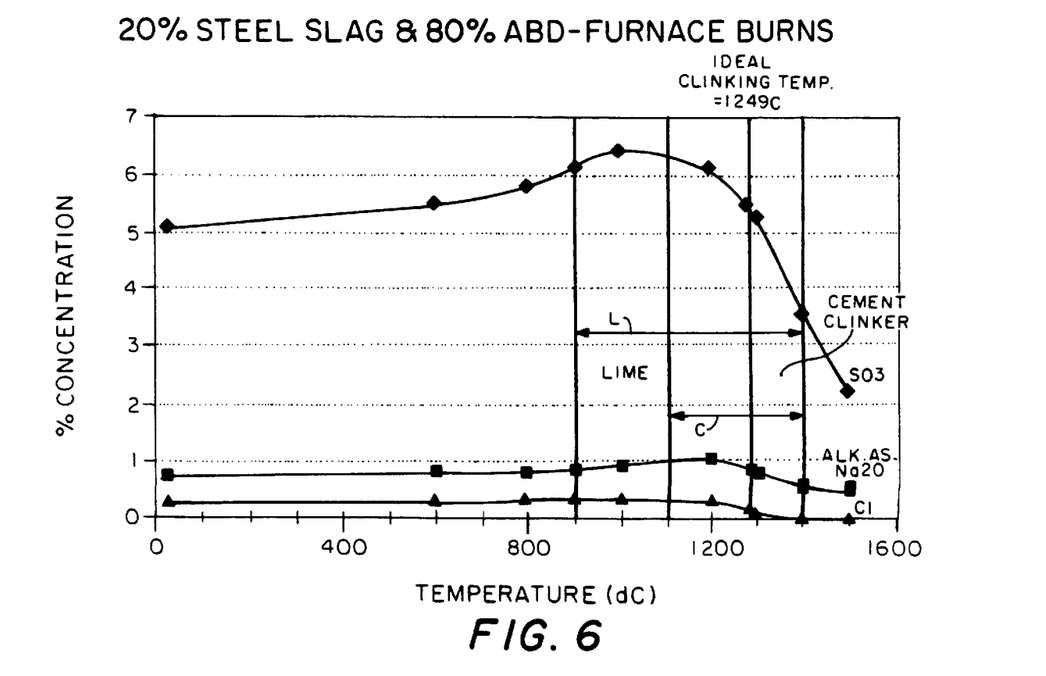
FIG. 6 is a graph similar to that in FIG. 5 except for ABD instead of CKD.

FIGS. 5 and 6 are graphs illustrating how undesirable chemicals can be volatilized at various temperatures in the kiln. Note in FIG. 5 that in the reclaiming of CKD material, that to form cement clinker, the temperature must be above about 1100 degrees C. (2012 degrees F.). However, note that the undesirable chemicals and compounds do not begin to volatilize until approximately 1200 degrees C. (2192 degrees F.). Even at 1400 degrees C. (2552 degrees F.), less than 2% of the $SO_3$ has volatilized. Most of the compound is still in solid form in the feedstock material. At 1400 degrees C. (2552 degrees F.), most of the chlorine has volatilized but it is such a small percent that in some cases, the cement clinker could be used to form special cement. Thus a usable range of temperatures for forming cement clinker is from about 1100 degrees C. (2012 degrees F.) to about 1400 degrees C. (2552 degrees F.) as shown in the cross-hatched area shown in FIG. 5 and line C in FIG. 6.

It can be seen in FIG. 6 that the same reasoning applied to CKD in FIG. 5 can also be applied to ABD (shown without the cross-hatching).

It will be understood by those skilled in the art that lime could also be formed using the waste dust and slag material.

It is well known to those skilled in the art that lime can be formed with feedstock material depending upon a time and temperature relationship as the feedstock material is passed through the kiln. The lower the temperature in the kiln, the longer the time the feedstock material can be left in the kiln. The higher the temperature in the kiln, the shorter the time the feedstock material can be left in the kiln. As noted by the single shading lines in FIG. 5 and line L in FIG. 6, lime can be formed with the waste dust and slag material in the temperature range of from about 900 degrees C. (1652 degrees F.) to about 1400 degrees C. (2552 degrees F.) depending on the time the feedstock material is left in the kiln. Those skilled in the art understand the time/temperature relationship necessary to form lime and they will not be discussed further here.

Here, as with the cement clinker, substantially all of the undesirable chemicals or chemical compounds are in the lime. Hence, substantially all of the waste dust is recovered.

Thus, all of the CKD or the ABD is utilized in the novel system of the present invention. The novel results are accomplished by (1) using waste dust, already processed at a high temperature in a first kiln making cement clinker and slag, formed during the process of creating a product such as steel, as the feedstock material (2) heating the feedstock material at a temperature (in the range of about 2300 degrees F. or 1260 degrees C. to about 2400 degrees F. or 1316 degrees C.) insufficient to volatilize the undesirable land fill solids in the waste dust and slag, and (3) heating the feedstock material in an oxidizing atmosphere so that no reduction of the feedstock material takes place thereby placing substantially all of the undesirable chemical compounds in the waste dust and slag in the hydraulic material formed in the second kiln.

Figure 4:
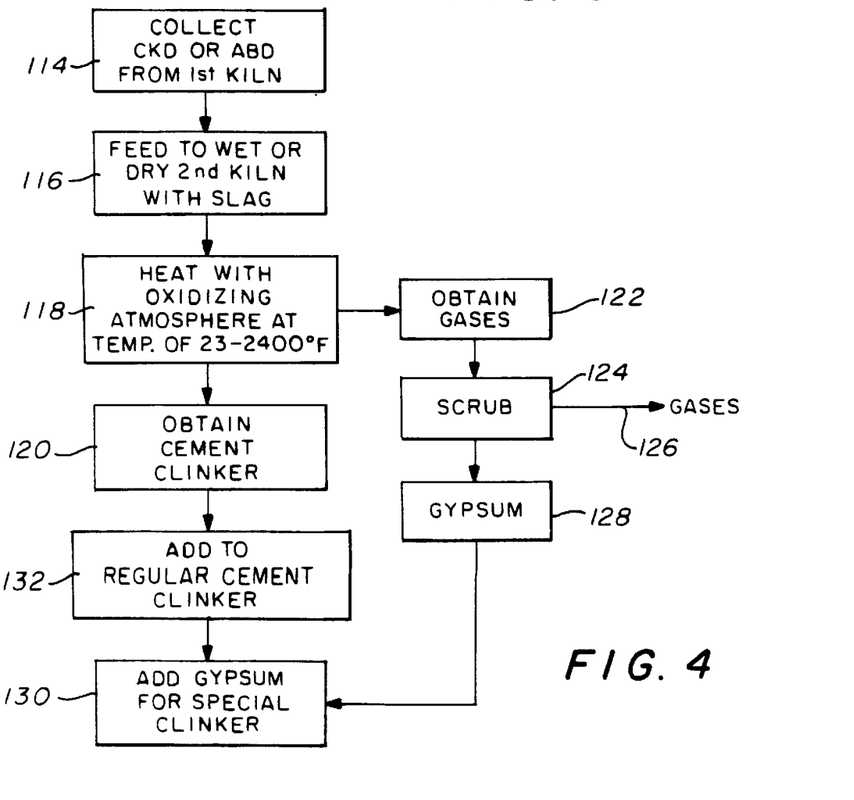
FIG. 4 is a flow chart illustrating the novel process of the present invention.

The novel process is shown in the flow chart of FIG. 4. At step 114, the waste dust (CKD or ABD) is collected from a first kiln and, at step 116, the waste dust, along with slag, is fed to the feed-end of a second kiln (rotary or otherwise) as the feedstock material. At step 118, the feedstock material is heated in the second kiln with an oxidizing atmosphere at a temperature in the range of from about 2012 degrees F. (1100 degrees C.) to about 2552 degrees F. (1400 degrees C.). Cement clinker is obtained at step 120. At step 122, the waste gases are obtained from the second kiln 94 and fed to a scrubber 124, well known in the art, where any solids remaining in the waste gases are removed at step 128. These solids are not objectionable and could be placed in a land fill. However, the solids recovered at step 128 may be, for instance, gypsum that can be transferred to finish mill 112 where it can be combined with the cement clinker from kiln 84 and kiln 94 in FIG. 3 to form cement clinker of special grades. The non-harmful gases that are left are coupled to a stack for injection into the atmosphere.

Thus, there has been disclosed a novel process and apparatus for disposing waste dust containing precipitated, undesirable chemical compounds that are produced in a kiln during the process of forming cement clinker.

The novel process and apparatus both utilize (1) slag (steel, blast furnace, copper, and coal) and waste dust (CKD and ABD) as the feedstock material, (2) a kiln (of any type) for receiving the feedstock material and having an oxidizing atmosphere, and (3) a heat source coupled to the kiln for heating the feedstock material in the oxidizing atmosphere to a temperature in the range of about 2012 degrees F. (1100 degrees C.) to about 2552 degrees F. (1400 degrees C.) which is insufficient to volatilize the undesirable chemical compounds that are in both the slag and the waste dust.

The corresponding structures, materials, acts, and equivalents of all means or step plus function elements in the claims below are intended to include any structure, material, or act for performing the function in combination with other claimed elements as specifically set forth in the claims.

What is claimed is:

1. Apparatus for disposing of at least one of CKD (cement kiln dust) and ABD (alkaline bypass dust) waste dust generated in the manufacture of cement clinker in at least one cement-making kiln, said waste dust containing undesirable chemicals and chemical compounds, the apparatus comprising:

a subsequent cement-making kiln;

first device for transporting said at least one of said CKD and ABD waste dust generated by said at least one cement-making kiln to said subsequent cement-making kiln;

a feed device for adding an amount of slag material to said subsequent cement-making kiln; and a heat source in said subsequent cement-making kiln for heating said subsequent cement-making kiln to a temperature sufficient to diffuse said slag material with said at least one of said CKD and ABD waste dust to form a hydraulic material, said temperature being insufficient to volatilize said undesirable chemicals and chemical compounds thereby causing said formed hydraulic material to contain substantially all of said undesirable chemical and chemical compounds.

2. The apparatus of claim 1 further including:

said forming of said hydraulic material in said subsequent cement-making kiln generating new waste dust;

a dust collector for collecting said newly generated waste dust; and a second device for transporting said new waste dust from said dust collector to said cement-making kiln as a feedstock material thereby disposing said undesirable chemical compounds by incorporating them into the hydraulic product being formed in said subsequent cement-making kiln.

3. The apparatus of claim 2 wherein said hydraulic material formed in said subsequent cement-making kiln is cement clinker.

4. The apparatus of claim 2 wherein said hydraulic material formed in said subsequent cement-making kiln is lime.

5. The apparatus of claim 1 wherein said at least one cement-making kiln and said cement-making kiln are different kilns.

6. A system for the manufacture of cement clinker using waste dust containing undesirable chemicals and chemical compounds as a feedstock material comprising:

a cement-making kiln;

a source of at least one of CKD and ABD waste dust;

apparatus for providing said at least one of said CKD and ABD waste dust for use by said kiln as a feedstock material;

apparatus for adding slag material as an additional feedstock material to said kiln; and a heat source for said kiln to heat said feedstock material including said slag material and said waste dust to a temperature sufficient to diffuse said slag material with said waste dust to form a hydraulic material, said temperature further selected to prevent volatilization of said undesirable chemicals and chemical compounds above a level where resulting gases carry a level of waste products requiring landfill disposal.

7. The system of claim 6 wherein said manufacture of cement clinker generates new waste dust and further including a dust collector for collecting said newly generated waste dust and apparatus for transporting said new waste dust from said dust collector to said kiln as a portion of said waste dust provided to said kiln as a feedstock material.

8. The system of claim 6 wherein said selected temperature is between about 900° C. and about 1400° C.

9. The system of claim 6 wherein said source of waste dust is landfill from other processes.

10. The system of claim 6 wherein said source of waste dust is a byproduct of earlier processing by said cement-making kilns.

11. Apparatus for disposing of at least one of said CKD and ABD waste dust generated in the manufacture of cement clinker and containing undesirable chemicals and chemical compounds comprising:

a cement-making kiln;

first means for transporting said at least one of CDK and ABD waste dust to said kiln as a feedstock material;

a feed device for adding slag material as an additional feedstock material; and a heat source in said kiln for heating said feedstock material including said slag material and said waste dust to a temperature sufficient to diffuse said slag material with said waste dust to form a hydraulic material, said temperature further selected to minimize volatilization of said undesirable chemicals and chemical compounds thereby causing said formed hydraulic material to contain substantially all of said undesirable chemicals and chemical compounds.

12. A method for disposing of at least one of CKD and ABD waste dust containing undesirable chemicals and chemical compounds that normally require landfill disposal, said waste dust being produced in a process for forming cement clinker, the method comprising the steps of:

inputting said at least one of said CKD and ABD waste dust to a kiln;

adding an amount of slag material to said kiln; and heating said waste dust and said slag material in said kiln to a temperature sufficient to diffuse said slag into said waste dust to form a hydraulic material, said temperature further selected to prevent volatilization of said undesirable chemicals and chemical compounds above a level where resulting gases carry a level of waste products requiring landfill disposal.

13. The process of claim 12 wherein the step of using waste dust further comprises the step of using cement kiln dust (CKD) generated by at least a first cement kiln during the process of forming cement clinker.

14. The process of claim 12 wherein the step of using reclaimed waste dust further comprises the step of using alkaline by-pass cement kiln dust (ABD) as said waste dust.

15. The process of claim 14 further comprising the step of using said ABD dust generated by at least one vertical cement kiln during the process of forming cement clinker.

16. The process of claim 12 wherein the step of adding an amount of slag material further comprises the step of using copper slag as said slag material.

17. The process of claim 12 wherein the step of adding an amount of slag material further comprises the step of using coal slag generated during the process of burning coal to form said slag material.

18. The process of claim 12 wherein the step of adding an amount of slag material further comprises the step of using steel slag generated during the production of steel with an electric arc furnace as said slag material.

19. The process of claim 18 further including the step of crushing and screening said steel slag prior to using said steel slag as said feedstock material.

20. The process of claim 19 further including the step of crushing and screening said steel slag to obtain particles with a maximum diameter of substantially 2" for use as said feedstock material.

21. The process of claim 12 wherein the step of adding an amount of slag material further comprises the step of using blast furnace slag generated during the production of steel with a blast furnace as said slag material.

22. The process of claim 21 further including the step of crushing and screening said blast furnace slag prior to using said blast furnace slag as said feedstock material.

23. The process of claim 22 further including the step of crushing and screening said blast furnace slag to obtain particles having a maximum diameter of substantially 2" for use as said feedstock material.

24. The process of claim 12 wherein said undesirable chemical compounds are from the group consisting of chlorine, sulfur, and alkali.

25. The process of claim 12 further including the step of using a rotary kiln as said cement-making kiln.

26. The process of claim 12 further including the step of using a vertical kiln as said cement-making kiln.

27. The method of claim 12 further including the steps of:

creating a new waste dust during the process of forming said hydraulic material; and transferring said new waste dust to said kiln for use as a portion of said inputted waste dust.

28. The method of claim 12 further comprising the steps of processing said cement kiln dust and/or slag prior to being input to said kiln.

29. The method of claim 28 wherein said processing step comprises forming a slurry of said cement kiln dust and slag.

30. The method of claim 12 and further including the step of adjusting the temperature over a range to vary the volatilization of said undesirable chemicals and chemical compounds to select the composition of the resultant product.

31. The method of claim 30 wherein said temperature range is selected to be between from about 900° C. and about 1400° C.

32. A method of forming cement clinker using at least one of CKD and ABD waste dust containing undesirable chemicals and chemical compounds that normally require landfill disposal as a feedstock material the method comprising the steps of:

inputting said at least one of said CKD and ABD waste dust to a designated kiln;

inputting an amount of slag to said designated kiln; and heating said waste dust and said slag material in said designated kiln to a temperature sufficient to diffuse said slag material into said waste dust to form a hydraulic material, said temperature being insufficient to volatilize said undesirable chemicals and chemical compounds thereby causing said formed hydraulic material to contain substantially all of said undesirable chemicals and chemical compounds thereby substantially eliminating the production of waste dust containing undesirable chemicals and chemical compounds that normally have to be disposed of in a landfill.

* * * * *

UNITED STATES PATENT AND TRADEMARK OFFICE
CERTIFICATE OF CORRECTION

PATENT NO. : 6,322,355 B1  Page 1 of 1
DATED : November 27, 2001
INVENTOR(S) : Rom D. Young It is certified that error appears in the above-identified patent and that said Letters Patent is hereby corrected as shown below:

Column 6,
Line 65, replace "$2CO_2$" at the end of the line with -- $2SO_2$ --.

Column 7,
Line 1, replace "$2CO_4$" at the end of the line with -- $2SO_4$ --.

Column 10,
Lines 14 and 55, delete second occurrence of "said."

Column 11,
Line 13, replace "kilns" with -- kiln --.
Line 14, delete "said."
Line 38, delete second occurrence of "said."

Column 12,
Line 51, delete second occurrence of "said."

Signed and Sealed this

Eleventh Day of November, 2003

JAMES E. ROGAN
*Director of the United States Patent and Trademark Office*